(12) United States Patent
Jorge et al.

(10) Patent No.: US 8,497,222 B2
(45) Date of Patent: Jul. 30, 2013

(54) ALUMINA-MAGNESIA MATERIAL FOR A GASIFIER

(75) Inventors: Eric Jorge, Les Valayans (FR); Sebastien Bourdonnais, Avignon (FR)

(73) Assignee: Saint-Gobain Centre de Recherches et d'Etudes Europeen, Courbevoir (FR)

( * ) Notice: Subject to any disclaimer, the term of this patent is extended or adjusted under 35 U.S.C. 154(b) by 54 days.

(21) Appl. No.: 13/375,096

(22) PCT Filed: Jun. 1, 2010

(86) PCT No.: PCT/IB2010/052446
§ 371 (c)(1),
(2), (4) Date: Dec. 23, 2011

(87) PCT Pub. No.: WO2010/140120
PCT Pub. Date: Dec. 9, 2010

(65) Prior Publication Data
US 2012/0100043 A1 Apr. 26, 2012

(30) Foreign Application Priority Data

Jun. 2, 2009 (FR) .................................... 09 53624

(51) Int. Cl.
*C04B 35/107* (2006.01)
*C04B 35/05* (2006.01)
*B01J 19/02* (2006.01)

(52) U.S. Cl.
USPC ........................... 501/119; 501/120; 422/185

(58) Field of Classification Search
USPC ........................... 501/118, 119, 120; 422/185
See application file for complete search history.

(56) References Cited

FOREIGN PATENT DOCUMENTS

| FR | 1.208.577 | 2/1960 |
| FR | 75.893 | 7/1961 |
| FR | 82.310 | 12/1963 |

OTHER PUBLICATIONS

Taber; "Refractories for Gasification;" *Refractories Applications and News*; Jul.-Aug. 2003; pp. 18-22; vol. 8, No. 4; Energy Systems Department of the Saint-Gobain Industrial Ceramics Division.
Bennett et al.; "Refractory Liner Materials Used in Slagging Gasifiers;" *Refractories Applications and News*; Sep./Oct. 2004; pp. 20-25; vol. 9, No. 5.
Clayton et al.; "Gasification Technologies, Gasification Markets and Technologies—Present and Future, an Industry Perspective;" US DOE, DOE/FE report 0447, Jul. 2002.
Routschka et al.; *Pocket Manual, Refractory Materials, $3^{rd\ Edition}$*; May 14, 2008; pp. 206-209; Vulcan Verlag GmbH.
Aizenberg; "Determination of the Content of Metallic Copper and Its Free Oxides in a Chemical Phase Analysis of High-Alumina Refractory After Service;" *Refr. and Ind. Ceramics*; Jan. 1, 1969; pp. 120-123; vol. 10, No. 1-2.
Petkov et al.; "Chemical corrosion mechanisms of magnesia-chromite and chrome-free refractory bricks by copper metal and anode slag;" *Journal of the European Ceramic Society*; 2007; pp. 2433-2444; vol. 27.
Wang et al.; "Codebook Organization to Enhance Maximum a Posteriori Detection of Progressive Transmission of Vector Quantized Images Over Noisy Channels;" *Proceedings of the International Conference on Acoustics, Speech, and Signal Processing (ICASSP)*; *IEEE*; Apr. 27, 1993; pp. V-233-V-236; vol. 5; New York, U.S.A.
International Search Report dated Aug. 10, 2010 in International Application No. PCT/IB2010/052446.

*Primary Examiner* — Karl Group
(74) *Attorney, Agent, or Firm* — Oliff & Berridge, PLC

(57) ABSTRACT

A molten and cast refractory material having a chemical composition, in weight percent on the basis of oxides, of: —$Al_2O_3$: the remainder up to 100%; —MgO: 28% to 50%; —CuO: 0.05% to 1.0%; —$B_2O_3$: ≦1.0%; —$SiO_2$: <0.5%; —$Na_2O+K_2O$: <0.3%; —CaO: <1.0%; —$Fe_2O_3+TiO_2$: <0.55%; —and other oxide species: <0.5%.

15 Claims, No Drawings

ALUMINA-MAGNESIA MATERIAL FOR A GASIFIER

BACKGROUND

The invention relates to a fused-cast refractory product comprising more than 50% alumina $Al_2O_3$ by weight and more than 10% magnesia MgO by weight.

Among refractory products, a distinction is conventionally made between fused-cast products and sintered products.

Unlike sintered products, fused-cast products usually include an intergranular glassy phase linking crystallized grains. The problems posed by sintered products and by fused-cast products, and the technical solutions adopted for solving them, are therefore generally different. A composition developed for manufacturing a sintered product is therefore a priori unable to be used as such for manufacturing a fused-cast product, and vice versa.

Fused-cast products, often called "electrocast" products, are obtained by melting a mixture of appropriate raw materials in an electric arc furnace or by any other technique suitable for these products. The molten material is then cast in a mold, after which the product obtained undergoes a controlled cooling cycle so as to be brought to room temperature without fracturing. This operation is called "annealing" by those skilled in the art. It may also be free cooling, according to the molding technology used.

The fused-cast product Monofrax® L, produced and sold by RHI Monofrax Ltd, has a chemical composition comprising 53.6% $Al_2O_3$, 44.9% MgO, 0.44% silica $SiO_2$, 0.23% sodium oxide $Na_2O$ and less than 0.35% CaO by weight.

The gasification of coal is a process, known for about fifty years, which currently is undergoing considerable development. Specifically, it allows the production, on the one hand, of syngas (CO, $H_2$)—a clean energy source—and, on the other hand, of basic compounds for the chemical industry starting from very diverse hydrocarbon materials, for example coal, petroleum coke or even heavy oils to be recycled. This process furthermore makes it possible to remove the undesirable components, for example NOx, sulfur or mercury, before any discharge into the atmosphere.

The principle of gasification consists of a controlled partial combustion, in steam and/or oxygen, at a temperature of between about 1150° C. and 1600° C. and under pressure.

There are various types of gasifier: fixed bed gasifier, fluidized bed gasifier and entrained bed gasifier. These gasifiers differ by the way in which the reactants are introduced, the way in which the oxidant-fuel mixture is made, the temperature and pressure conditions and the process for removing the ash or slag, liquid residues resulting from the reaction.

The article entitled "Refractories for Gasification" published in the journal Refractories Applications and News, Volume 8, Number 4, July-August 2003, written by Wade Taber of the Energy Systems Department of the Saint-Gobain Industrial Ceramics Division, describes the structure of an internal lining for a gasifier.

The refractory products of an internal gasifier lining are subjected to thermal cycling, corrosion and erosion by the slag or dry ash and the effect of hot spots where the temperature may typically reach about 1400° C. The erosion and corrosion may especially result in the infiltration, into the pores of the refractory products, of slag compounds or liquefied ash, which, under the effect of the erosion and the thermal cycling, may cause the lining to flake off and finally stop the reactor.

Moreover, the development of gasification of black liquor resulting from the manufacture of paper pulp requires new materials that are capable of withstanding the corrosive action of sodium compounds and, in particular, have a low porosity in order to prevent infiltration of aggressive substances.

To increase the lifetime of refractory linings, researchers have tried to increase its thickness. However, this solution has the drawback of increasing the costs and of reducing the useful volume of the gasifier, and therefore reducing its efficiency.

James P. Bennett, in the article "Refractory liner used in slagging gasifiers" published in the journal Refractories Applications and News, Volume 9, number 5, September-October 2004, pages 20-25, explains that the lifetime of current gasifier refractory linings, in particular in air-cooled systems, is very limited despite their high chromium oxide content. Mentioned in particular is the report by S. J. Clayton, G. J. Stiegel and J. G Wimer "Gasification Technologies, Gasification Markets and Technologies—Present and Future, an Industry Perspective", US DOE, DOE/FE report 0447, July 2002. The use of products containing chromium has also been abandoned in the case of black liquor gasification.

There is therefore a need for a refractory product having properties tailored to the specific environments encountered inside gasifiers and in particular having a porosity low enough to limit the infiltration of aggressive substances.

The aim of the present invention is to meet this need.

SUMMARY OF THE INVENTION

More particularly, the invention relates to a fused-cast refractory product having a chemical composition such that, in percentages by weight on the basis of the oxides:

| | |
|---|---|
| $Al_2O_3$: | balance to 100%; |
| MgO: | 28% to 50%; |
| CuO: | 0.05% to 1.0%; |
| $B_2O_3$: | $\leq$ 1.0%; |
| $SiO_2$: | $\leq$ 0.5%; |
| $Na_2O + K_2O$: | $\leq$ 0.3%; |
| CaO: | $\leq$ 1.0%; |
| $Fe_2O_3 + TiO_2$: | < 0.55%; |
| other oxide species | < 0.5%. |

As will be seen later, the inventors have surprisingly discovered that this composition makes it possible with a refractory product according to the invention to have a low porosity while maintaining a high corrosion resistance.

A refractory product according to the invention may also have one or more of the following optional features:

the CuO mass content is greater than or equal to 0.10%, or even greater than or equal to 0.15%, or even greater than or equal to 0.20%;

the CuO mass content is less than or equal to 0.8%, or even less than or equal to 0.7%, or even less than or equal to 0.6%;

the $B_2O_3$ mass content is greater than or equal to 0.05%, or even greater than or equal to 0.1%;

the $B_2O_3$ mass content is less than or equal to 0.8%, or even less than or equal to 0.6%, or even less than or equal to 0.4%, or even less than or equal to 0.3%;

the CuO mass content is greater than or equal to 0.10% and the $B_2O_3$ mass content is greater than or equal to 0.05%, or even greater than or equal to 0.1%, greater than 0.3%, greater than 0.4%, greater than 0.5%, or even greater than 0.6%;

the alumina $Al_2O_3$ mass content is less than or equal to 70%, or even less than or equal to 68%;

the $Al_2O_3$ mass content is greater than or equal to 55%, or even greater than or equal to 60%;

the MgO mass content is less than or equal to 45%, or even less than or equal to 40%;

the MgO mass content is greater than or equal to 28.2%, or even greater than or equal to 30%, or even greater than or equal to 32%;

the CaO mass content is less than or equal to 0.8%, less than or equal to 0.6%, or even less than or equal to 0.4%;

the ($Na_2O+K_2O$) mass content is less than or equal to 0.25%, less than or equal to 0.2%, or even less than or equal to 0.1%;

the silica $SiO_2$ mass content is less than or equal to 0.5%, or even less than or equal to 0.4%, or even less than or equal to 0.2%, or even less than or equal to 0.15%;

the iron and/or titanium and/or chromium and/or calcium oxides are present merely as impurities;

the mass content of iron and/or titanium oxides, $Fe_2O_3 + TiO_2$, is less than 0.4%, preferably less than 0.3%, preferably less than 0.2%;

the chromium oxide mass content is less than 0.2%, preferably less than 0.1%;

the "other oxide species" consist only of impurities;

the total mass content of the "other oxide species" is less than 0.4%, or even less than 0.3%;

the product takes the form of a part of complex shape or a block having dimensions exceeding 100 mm×100 mm×100 mm;

the product takes the form of a block weighing more than 5 kg;

the total porosity is less than 7%, preferably less than 6%;

the bulk density is greater than 3.15 $g/cm^3$, more preferably greater than 3.20 $g/cm^3$, more preferably still greater than 3.25 $g/cm^3$, or even greater than 3.30 $g/cm^3$;

the various oxides are distributed approximately uniformly within the product and in particular there is no systematic change (increase or decrease) in an oxide close to the external surface of the product.

The invention also relates to a process for manufacturing a refractory product according to the invention, comprising the following successive steps:

a) mixing of raw materials so as to form a feedstock;

b) melting of said feedstock so as to obtain a molten material; and c) casting and solidification of said molten material, by cooling, so as to obtain a refractory product, this process being noteworthy in that said raw materials are chosen in such a way that said refractory product is in accordance with the invention.

Preferably, the oxides for which a minimum content is necessary, especially $Al_2O_3$, MgO, CuO and optionally $B_2O_3$, or precursors of these oxides, for example $AlF_3$ or $B_4C$, are added systematically and methodically. Preferably, the contents of these oxides in the sources of the other oxides are taken into account. Boron may be introduced by any precursor, including $B_4C$, preferably in a form that limits excessively rapid fly-off during melting. $AlF_3$ is added to facilitate the onset of melting and as a source of fluorine, an element promoting the absence of cracking.

Preferably, the casting temperature in step c) is greater than or equal to 2000° C.

In step c), two routes are possible:

Casting into a mold clamped in a formwork using a granular insulator. The cooling is then natural, the process being called a "transferless" process.

Casting into a mold which is opened very rapidly to extract the part and to insert it into a box containing an insulator. The part is then immediately covered with insulator, the process being called a "transfer" process.

In the latter technology, the cooling is controlled, preferably so as to be carried out at a rate of less than 20° C. per hour, preferably at a rate of about 10° C. per hour.

The invention also relates to a block made of a product according to the invention or manufactured using a process according to the invention.

The invention also relates to a gasifier lining in kit form, comprising an assembly of parts made of a product according to the invention, the respective shapes of said parts being adapted so as to form said lining by assembly. In particular, the lining may be designed to allow passage of at least one conduit by matching the external shape of said conduit and/or to have at least one reentrant angle.

The invention also relates to a gasifier, a reactor of which is lined, at least partly, with a refractory lining comprising a refractory product according to the invention or a refractory product manufactured or capable of being manufactured using a process according to the invention, in particular in a region intended to be in contact with a slag or a corrosive liquor.

The refractory lining preferably takes the form of an assembly of blocks.

The reactor may contain coal or black liquor resulting from the manufacture of paper pulp.

DEFINITIONS

The oxide mass contents relate to the overall contents for each of the corresponding chemical elements, expressed in the form of the most stable oxide, using the standard convention in the industry. These therefore include suboxides and possibly nitrides, oxynitrides, carbides, oxycarbides, carbonitrides and even metallic species of the abovementioned elements.

The term "molten material" is understood to mean a liquid mass which, to retain its shape, must be contained in a container. This mass may contain a few solid particles, but in an amount insufficient to be able to structure said mass.

The term "impurities" is understood to mean the inevitable constituents, involuntarily and necessarily introduced with the raw materials or resulting from reactions with these constituents. The impurities are not necessary constituents, but are merely tolerated. For example, compounds forming part of the group of oxides, nitrides, oxynitrides, carbides, oxycarbides, carbonitrides and metallic species of iron, titanium, vanadium and chromium are preferably impurities.

Unless otherwise mentioned, all the contents of oxides in the products described and claimed are percentages by weight on the basis of the oxides.

DETAILED DESCRIPTION OF THE INVENTION

In a fused-cast product according to the invention, the high alumina content with an MgO content greater than 28% makes it possible to obtain a product of crystalline structure comprising predominantly $Al_2O_3$—MgO spinel, making it possible to the meet the requirements of high resistance to slag and corrosive liquors.

The inventors have found that the presence of copper oxide CuO advantageously enables products to be obtained that have a low porosity, provided that the CuO content is greater than 0.05% and preferably greater than 0.1% by weight.

During a manufacturing process that includes pouring a bath of molten material containing metal (iron or copper), it is known that the metal tends to accumulate at the bottom of the bath and therefore contributes in piercing the vessel containing the bath and possibly disturbing the flow of electrical current, increasing the electrical losses. The inventors are credited with having gone counter to this recommendation, to discover the positive effect of adding CuO.

However, according to the invention, the CuO content must be limited to less than 1.0% since, above this, CuO may impair the refractoriness of the product by crating an excessive large amount of CuO—MgO and/or CuO—$Al_2O_3$ phases.

The inventors have also discovered that the presence of boron oxide $B_2O_3$ advantageously helps to promote the action of CuO.

The presence of boron also helps to eliminate sodium hydroxide by migrating to the surface of all alkalis; these alkalis are harmful to the resistance of the product to the formation of beta-alumina, which is a source of swelling and spalling of the product in service.

As the examples below show, the $B_2O_3$ mass content may be greater than or equal to 0.05%, or even greater than or equal to 0.1%.

However, the presence of $B_2O_3$ must be limited to contents of less than 1.0%, or even less than or equal to 0.8%, since above this $B_2O_3$ may impair the refractoriness by creating too much of a glassy phase.

The silica $SiO_2$ content must not exceed 0.5% as it may impair the corrosion resistance. In particular, with too high a content, the silica could combine with the impurities to increase the glassy phase, harmful to corrosion resistance, or react with alumina to form mullite. Now, the presence of mullite prejudices the resistance to corrosion by papermaking black liquor.

In a product according to the invention, the oxides $Na_2O$ and $K_2O$ are considered to have similar effects. The oxides $Na_2O$ and $K_2O$ have an unfavorable effect on the resistance to the formation of beta-alumina and tend to increase the content of the glassy phase. The mass content of $Na_2O+K_2O$ must therefore be less than or equal to 0.3%.

The CaO mass content must also be less than or equal to 1.0%, preferably less than or equal to 0.4%.

According to the invention, the mass content of $Fe_2O_3$+$TiO_2$ is less than 0.55% and preferably the $Cr_2O_3$ mass content is less than 0.2%, preferably less than 0.10%. This is because these oxides are deleterious and their content must preferably be limited to traces, preferably introduced as impurities with the raw materials.

The "other oxide species" are species that are not listed above, namely species other than $Al_2O_3$, MgO, CuO, $B_2O_3$, $SiO_2$, $Na_2O$, $K_2O$, CaO, $Fe_2O_3$ and $TiO_2$. In one embodiment, the "other oxide species" are limited to species whose presence is not particularly desired and which are generally present as impurities in the raw materials.

Conventionally, in a fused-cast product, the oxides represent more than 98.5% or more than 99% or even substantially 100% of the mass of the product. The same applies in a product according to the invention.

A product according to the invention may have a complex shape. In particular, it may take the form of a brick or block having a nonplanar surface, for example a concave and/or convex surface, especially a cylindrical, conical or angled surface. A complex shape makes it possible in particular for the lining to fit the arrangement of the members of a gasifier and in particular for ducts to pass therethrough.

A product according to the invention may be conventionally manufactured via the steps a) to c) described below:

a) mixing of raw materials so as to form a feedstock;

b) melting of said feedstock so as to obtain a molten material; and c) solidification of said molten material, by cooling, so as to obtain a refractory product according to the invention.

In step a), the raw materials are chosen so as to guarantee the oxide contents in the end product.

In step b), the melting is preferably carried out by combining the action of quite a long electric arc, causing no reduction, with stirring, which promotes reoxidation of the products. Short or moderately short arc adjustment can also be used for producing the product.

To minimize the formation of nodules with a metallic aspect and to avoid formation of cracks or crazes in the end product, it is preferable to carry out the melting operation under oxidizing conditions.

Preferably, the long-arc melting process described in French patent No. 1 208 577 and its additions No. 75893 and No. 82310 is used.

This process consists in using an electric arc furnace in which the arc is struck between the charge and at least one electrode away from this charge, and in adjusting the length of the arc so that its reducing action is minimized, while still maintaining an oxidizing atmosphere above the molten bath and stirring said bath.

The melting operation may in particular be carried out at a temperature above 2000° C., preferably between 2050° C. and 2200° C.

In step c), the cooling can be varied according to the molding technology necessary for producing the parts.

A product of the invention thus manufactured mainly consists of alumina-magnesia spinel and periclase crystals. No alumina crystals are observed.

EXAMPLES

The following nonlimiting examples are given for the purpose of illustrating the invention.

In these examples, the following raw materials were employed:

calcined alumina mainly containing, as weight average, 99.5% $Al_2O_3$, 0.27% $Na_2O$ and 100 ppm $SiO_2$;

$AlF_3$ containing at most 0.15% $SiO_2$ and at most 0.25% $Na_2O$;

calcined high-purity synthetic magnesia, containing 98.5% MgO, at most 0.9% CaO, 0.2% $SiO_2$ and at most 0.6% $Fe_2O_3$;

boron carbide, containing 76.25% boron, 20.1% carbon and 0.18% $Fe_2O_3$;

copper oxide $Cu_2O$ typically containing 98.7% $Cu_2O$ and 0.7% metallic copper.

The raw materials were melted using the conventional arc-furnace melting process, as described above, and then the molten material was poured to obtain blocks.

The chemical composition of the products obtained is given in table 1, namely the average overall chemical composition given in percentages by weight.

In table 1 below, * indicates that the example is outside the invention and an empty box corresponds to a content of 0.04 wt % or less. The balance to 100% consists of the oxide species other than those mentioned in the table.

Conventionally, the total porosity is measured using a precision balance, the bulk density by means of a mercury vessel and the absolute density by means of a helium pycnometer on ground powder.

The total porosity is given by the following equation:

Total porosity=100×(absolute density−bulk density)/absolute density

TABLE 1

|  | 1* | 2* | 3* | 4 | 5 | 6 | 7 | 8 | 9 | 10 |
|---|---|---|---|---|---|---|---|---|---|---|
| $Al_2O_3$ | 50.3 | 68.1 | 71.4 | 62.82 | 61.85 | 62.22 | 62.55 | 61.88 | 63.24 | 64.1 |
| MgO | 48.7 | 31.1 | 27.6 | 36 | 36.82 | 36.21 | 36.21 | 35.91 | 35.2 | 34.22 |
| CuO |  |  |  | 0.49 | 0.35 | 0.25 | 0.44 | 0.19 | 0.13 | 0.23 |
| $B_2O_3$ |  |  | 0.33 | 0.3 |  |  |  | 0.5 | 0.63 | 0.68 |
| $SiO_2$ | 0.10 | 0.10 | 0.08 | 0.08 | 0.05 | 0.05 | 0.05 | 0.05 | 0.05 | 0.05 |
| $Na_2O$ | 0.20 | 0.13 | 0.11 | 0.13 | ≦0.3 | ≦0.3 | ≦0.3 | ≦0.3 | 0.09 | 0.1 |
| CaO | 0.10 | 0.22 | 0.14 | 0.05 | 0.54 | 0.57 | 0.52 | 0.5 | 0.35 | 0.27 |
| $Fe_2O_3$ | 0.27 | 0.17 | 0.11 | 0.13 | 0.21 | 0.22 | 0.21 | 0.21 | 0.18 | 0.22 |
| Total porosity (%) | 15 | 15.3 | 10.9 | 4.5 | 5.5 | 6.2 | 6.7 | 6.5 | 3.8 | 5.7 |
| Bulk density ($g/cm^3$) |  |  |  | 3.43 | 3.4 | 3.38 | 3.35 | 3.35 | 3.44 | 3.38 |

The results show that the tested products of the invention have a lower porosity than the comparative examples, thereby enabling them in particular to limit the infiltration of slag.

Of course, the present invention is not limited to the embodiments described, these being provided as illustrative and nonlimiting examples.

The invention claimed is:

1. A fused-cast refractory product having a chemical composition comprising in percentages by weight on the basis of the oxides:

| $Al_2O_3$: | balance to 100%; |
| MgO: | 28% to 50%; |
| CuO: | 0.05% to 1.0%; |
| $B_2O_3$: | ≦ 1.0%; |
| $SiO_2$: | ≦ 0.5%; |
| $Na_2O + K_2O$: | ≦ 0.3%; |
| CaO: | ≦ 1.0%; |
| $Fe_2O_3 + TiO_2$: | < 0.55%; |
| other oxide species | < 0.5%. |

2. The product as claimed in claim 1, in which the CuO mass content is greater than or equal to 0.10% and less than or equal to 0.8%.

3. The product as claimed in claim 2, in which the CuO mass content is greater than or equal to 0.15% and less than or equal to 0.7%.

4. The product as claimed in claim 3, in which the CuO mass content is greater than or equal to 0.20% and less than or equal to 0.6%.

5. The product as claimed in claim 1, in which the $B_2O_3$ mass content is greater than or equal to 0.05%.

6. The product as claimed in claim 5, in which the $B_2O_3$ mass content is greater than or equal to 0.1%.

7. The product as claimed in claim 1, in which the $B_2O_3$ mass content is less than or equal to 0.6%.

8. The product as claimed in claim 7, in which the $B_2O_3$ mass content is less than or equal to 0.3%.

9. The product as claimed in claim 1, in which the alumina $Al_2O_3$ mass content is less than or equal to 70% and greater than or equal to 55%.

10. The product as claimed in claim 9, in which the alumina $Al_2O_3$ mass content is less than or equal to 68% and greater than or equal to 60%.

11. The product as claimed in claim 1, in which the MgO mass content is less than or equal to 45% and greater than or equal to 28.2%.

12. The product as claimed in claim 11, in which the MgO mass content is less than or equal to 40% and greater than or equal to 30%.

13. The product as claimed in claim 1, in which:
the CaO mass content is less than or equal to 0.6%; and/or
the $Na_2O+K_2O$ mass content is less than or equal to 0.25%; and/or
the silica $SiO_2$ mass content is less than or equal to 0.15%; and/or
the mass content of iron and/or titanium oxides, $Fe_2O_3+TiO_2$, is less than 0.4%; and/or
a chromium oxide mass content is less than 0.1%.

14. A gasifier, a reactor of which is lined, at least partly, with a refractory lining comprising a refractory product as claimed in claim 1.

15. The gasifier as claimed in claim 14, the reactor of which contains coal or black liquor resulting from the manufacture of paper pulp.

* * * * *